US006037944A

United States Patent [19]
Hugh

[11] Patent Number: 6,037,944
[45] Date of Patent: *Mar. 14, 2000

[54] METHOD AND APPARATUS FOR DISPLAYING A THOUGHT NETWORK FROM A THOUGHT'S PERSPECTIVE

[75] Inventor: Harlan M. Hugh, Los Angeles, Calif.

[73] Assignee: Natrificial LLC, Santa Monica, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/747,092

[22] Filed: Nov. 7, 1996

[51] Int. Cl.⁷ ....................................................... G06F 3/00

[52] U.S. Cl. ........................................... 345/357; 709/100

[58] Field of Search ..................................... 345/326–358, 345/968, 963; 395/670–671, 672; 709/100, 101, 102–108

[56] References Cited

U.S. PATENT DOCUMENTS

| | | | |
|---|---|---|---|
| 4,712,191 | 12/1987 | Penna ....................................... | 345/357 |
| 4,752,889 | 6/1988 | Rappaport et al. .................. | 346/357 X |
| 4,764,867 | 8/1988 | Hess ........................................ | 364/200 |
| 4,773,024 | 9/1988 | Faggin et al. ........................... | 364/513 |
| 4,796,199 | 1/1989 | Hammerstrom et al. ............... | 364/513 |
| 4,802,103 | 1/1989 | Faggin et al. ........................... | 364/513 |
| 4,821,211 | 4/1989 | Torres ..................................... | 364/521 |

(List continued on next page.)

FOREIGN PATENT DOCUMENTS

| | | | |
|---|---|---|---|
| 0 273 435 | 7/1988 | European Pat. Off. ........ | G06F 15/40 |
| 0 325 777 | 8/1989 | European Pat. Off. ........ | G06F 11/30 |
| 44 40598 C | 5/1996 | Germany .......................... | G08F 3/16 |

OTHER PUBLICATIONS

Halasz et al., "NoteCards in a Nutshell", ACM, pp. 45–52, 1987.

Burns et al., "A Graphical Entity–Relationship Database Browser", IEEE, pp. 694–704, 1988.

Foss, "Tools for Reading and Browsing Hypertext", Information Processing & Management, vol. 25, No. 4, pp. 407–418, 1989.

(List continued on next page.)

Primary Examiner—John E. Breene
Attorney, Agent, or Firm—Chien-Wei (Chris) Chou; Claude A. S. Hamrick; Oppenheimer, Wolff & Donnelly LLP

[57] ABSTRACT

An effective method and apparatus for organizing and processing chunks of interrelated information (or "thoughts") using a digital computer is disclosed. The invention utilizes highly flexible, associative thought networks to organize and represent digitally-stored thoughts. A thought network specifies a plurality of thoughts, as well as network relationships among the thoughts. A graphical representation of the thought network is displayed, including a plurality of display icons corresponding to the thoughts, and a plurality of connecting lines corresponding to the relationships among the thoughts. Each of the thoughts is associated with one or more software application programs, such as a word processing or spreadsheet utility. Users are able to select a current thought conveniently by interacting with the graphical representation, and the current thought is processed by automatically invoking the application program associated with the current thought in a transparent manner. Users can conveniently modify the thought network by interactively redefining the connecting lines between thoughts. In another aspect of the invention, attribute values are associated with the various thoughts of the network, and the network is searched to identify a subset of the thoughts having attribute values equal to a desired set of values. Further aspects of the invention include techniques for scheduling selected thoughts of the network for desired operations at specified times, and storing timing and usage statistics in order to preserve a history of the processing tasks performed on each thought.

20 Claims, 15 Drawing Sheets

U.S. PATENT DOCUMENTS

| | | | |
|---|---|---|---|
| 4,891,766 | 1/1990 | Derr et al. | 364/513 |
| 4,982,344 | 1/1991 | Jordan | 364/521 |
| 5,021,976 | 6/1991 | Wexelblat et al. | 345/356 |
| 5,072,412 | 12/1991 | Henderson, Jr. et al. | 395/159 |
| 5,115,504 | 5/1992 | Belove et al. | 395/600 |
| 5,144,693 | 9/1992 | Morgan | 395/158 |
| 5,204,947 | 4/1993 | Bernstein et al. | 345/357 |
| 5,206,950 | 4/1993 | Geary et al. | 395/600 |
| 5,222,196 | 6/1993 | Bigus | 395/26 |
| 5,226,117 | 7/1993 | Miklos | 395/157 |
| 5,295,242 | 3/1994 | Mashruwals et al. | 395/159 |
| 5,381,524 | 1/1995 | Lewis et al. | 395/161 |
| 5,418,950 | 5/1995 | Li et al. | 395/600 |
| 5,428,738 | 6/1995 | Bailey et al. | 395/161 |
| 5,437,007 | 7/1995 | Bailey et al. | 395/159 |
| 5,469,540 | 11/1995 | Powers, III et al. | 395/158 |
| 5,491,795 | 2/1996 | Beaudet et al. | 395/159 |
| 5,499,330 | 3/1996 | Lucas et al. | 345/145 |
| 5,506,937 | 4/1996 | Ford et al. | 395/12 |
| 5,530,942 | 6/1996 | Tzou et al. | 395/147 |
| 5,546,529 | 8/1996 | Bowers et al. | 345/357 X |
| 5,553,226 | 9/1996 | Kiuchi et al. | 395/161 |
| 5,555,354 | 9/1996 | Strasnick et al. | 345/357 X |
| 5,602,997 | 2/1997 | Carpenter et al. | 395/349 |
| 5,615,346 | 3/1997 | Gerken | 395/341 |
| 5,619,632 | 4/1997 | Lamping et al. | 345/356 X |
| 5,625,783 | 4/1997 | Ezekiel et al. | 395/352 |
| 5,644,740 | 7/1997 | Kiuchi | 345/357 |
| 5,666,503 | 9/1997 | Cmpanelli et al. | 345/357 |
| 5,786,820 | 7/1998 | Robertson | 345/357 |
| 5,801,702 | 9/1998 | Dolan et al. | 345/357 |
| 5,812,134 | 9/1998 | Pooser et al. | 345/356 |
| 5,870,559 | 2/1999 | Leshem et al. | 345/357 X |

OTHER PUBLICATIONS

Kent, R.E., et al: "Creating a Web Analysis and Visualization Environment" Computer Networks and ISDN Systems, vol. 1, No. 28, Dec. 1995, pp. 109–117, XP004001216.

Olsen, K.A., et al: "Visualization of a Document Collection: The Vibe System" Information Processing and Management (Incorporating Information Technology), vol. 29, No. 1, Jan. 1, 1993, pp. 69–81, XP000574984.

Carr L., et al: "Open Information Services" Computer Networks and ISDN Systems, vol. 28, No. 11, May 1996, pp. 1027–1036, XP004018205.

Apple Computer, Inc., *Macintosh Reference,* 1990.

Apple Computer, Inc., "Apple Drives Initiative to Bring Structured Content to the Internet", Sep. 18, 1996.

Axon Research, "Axon Idea Processor", copyright 1995–1997.

Vannevar Bush, "As We May Think", *The Atlantic Monthly,* Jul. 1945, vol. 176, No. 1, pp. 101–108.

Clearweb, Inc., "You Can See the Web Clearly Now", copyright date 1996.

CoCo Systems, Ltd, "VisiMap", copyright date 1996–1998.

James Farrows, "Navigating the Galaxies", *The Atlantic Monthly,* Apr. 1996, vol. 277, No. 4, pp. 119–124.

Inxight Software Inc., a Xerox New Enterprise Co., "Hyperbolic Tree Web Navigatikon", copyright date 1996–1997.

Michael Jetter, "Welcome to Mindman, the Creative Mind-Manager", copyright date 1996–1998.

Microsoft Corporation, *Microsoft Windows 95,* 1981.

Plum Design, "Thinkmap", copyright date 1998.

Noah Robischon, "Mapping the Future", *The Netly News Network,* Feb. 4, 1998.

Semino Corporation, "Semino", copyright 1996–1998.

Edward Tufte, "Envisioning Information", *Global Business Network,* Dec. 1990.

Tony Buzan, "The Mind Map Book", Plume, Mar. 1996.

```
boolean CheckForIsolation(int centralThought, int targetThought)
{
        // this function checks if centralThought is related to targetThought
        // via any of targetThought's relations (not directly)

// remove centralThought as a direct relation from targetThought
        RemoveRelation(targetThought, centralThought);

// create an empty thought list to keep track of the search
        intList searchList = CreateEmptyList();

// start recursive searches on each of targetThought's direct relations
        int relation = GetFirstRelation(targetThought);
        boolean found;
        do {
                found = Search(relation, centralThought, searchList);
                if(found) {
                        // centralThought was found, no need to search any further
                        break;
                }
                // this loop will end when there are no more relations
        } while(relation = GetNextRelation(targetThought);

// add centralThought back onto targetThought as a relation
        AddRelation(targetThought, centralThought);

return found;
}
```

Fig. 10a

```
boolean Search(source, dest, searchList)
{
        if(Find(source, searchList)) {
                // source has already been searched
                return FALSE;
        }

// add source to the searchList
        Add(source, searchList)

if(source == dest) {
                // this is the destination, we have found it
                return TRUE;
        }

// recursive searches on each of sources direct relations
        int relation = GetFirstRelation(source);
        boolean found;
        do {
                found = Search(relation, dest, searchList);
                if(found) {
                        // centralThought was found, no need to search any further
                        break;
                }
                // this loop will end when there are no more relations
        } while(relation = GetNextRelation(targetThought);

return found;
}
```

Fig. 10b

METHOD AND APPARATUS FOR DISPLAYING A THOUGHT NETWORK FROM A THOUGHT'S PERSPECTIVE

FIELD OF THE INVENTION

This invention relates to a computer-controlled graphical user interface ("GUI") for organizing and processing interrelated pieces of information, hereinafter referred to as "thoughts."

BACKGROUND

The general-purpose digital computer is one of the most powerful and remarkable information processing tools ever invented. Indeed, the advent of the digital computer has thrust the world headlong into what is now recognized by many analysts as an "information era" and an "information economy," in which the ability to access and process information in an effective manner is one of the most important forms of economic power.

The potential impact of the digital computer on information processing is undeniably revolutionary. Yet, conventional software environments are generally organized around metaphors and principles from earlier eras. Text-based operating systems like Microsoft DOS essentially treat the computer as a giant filing cabinet containing documents and applications. A strictly hierarchical file directory provides a rigid, tree-like structure for this digital file cabinet. Individual documents are the "leaves" of this tree hierarchy. The directory structure generally does not include or express relationships between leaves, and users generally access documents and applications individually, using the directory structure. Even the now ubiquitous graphical "desktop" computing environment, popularized for personal computers by the Apple Macintosh® and Microsoft Windows® operating systems, also simulates a traditional office environment. Individual documents and applications, represented by graphical icons, are displayed on the user's screen, to be accessed one-at-a-time. Once again, a strictly hierarchical, tree-like directory structure is imposed to organize the contents of the desktop.

Although the desktop and file cabinet metaphors have been commercially successful, the limitations and drawbacks of these traditional metaphors become clear when one considers the strikingly different way in which the world's other powerful information processing machine—the human brain—organizes information. Instead of being confined and limited to strictly hierarchical file directory structures, the human brain is thought to interconnect numerous pieces of information through flexible, non-hierarchical, associative networks. As those of skill and experience in the art are aware, it is often clumsy for users of traditional, prior art operating system interfaces to process multiple pieces of information if these pieces are contextually related in some way, but are stored in separate files and/or are associated with different application programs. These traditional limitations therefore often lead frustrated users to organize their thought processes around their computer software, instead of the reverse.

What is desired is an effective methodology for organizing and processing pieces of interrelated information (or "thoughts") using a digital computer. The methodology should support flexible, associative networks of digital thoughts, and not be limited to strict, tree hierarchies as are conventional, prior art technologies. A related goal is to create an intuitive and accessible scheme for graphically representing networks of thoughts, providing users with access to diverse types of information in a manner that maximizes access speed but minimizes navigational confusion.

SUMMARY OF THE INVENTION

The present invention enables users to organize information on a digital computer in a flexible, associative manner, akin to the way in which information is organized by the human mind. Accordingly, the present invention utilizes highly flexible, associative thought networks to organize and represent digitally-stored thoughts. A thought network specifies a plurality of thoughts, as well as network relationships among the thoughts. Because the network structure is flexible, each thought may be connected to a plurality of related thoughts. A graphical representation of the thought network is displayed, including a plurality of display icons corresponding to the thoughts, and a plurality of connecting lines corresponding to the relationships among the thoughts. Each of the thoughts may be associated with one or more software application programs, such as a word processing or spreadsheet utility. Users are able to select a current thought conveniently by interacting with the graphical representation, and the current thought is processed by automatically invoking the application program associated with the current thought in a transparent manner. Users can modify the thought network by interactively redrawing the connecting lines between thoughts, and relationships within the thought network are then automatically redefined in a corresponding manner.

In another aspect of the present invention, descriptive attribute values are associated with each thought of the network, and database searching is performed for thoughts that are characterized by desired attribute values. Other preferred features of the present invention include storing timing and usage information regarding the processing of thoughts, so that the system can report and describe the user's work patterns, and can "rewind" or "replay" portions of work previously performed by the user. Particular thoughts can also be scheduled for desired operations at specified times.

BRIEF DESCRIPTION OF THE DRAWINGS

FIG. 10 discloses an algorithm which may be implemented in a preferred embodiment of the present invention.

DETAILED DESCRIPTION OF THE INVENTION

General System Architecture

Figure 1:
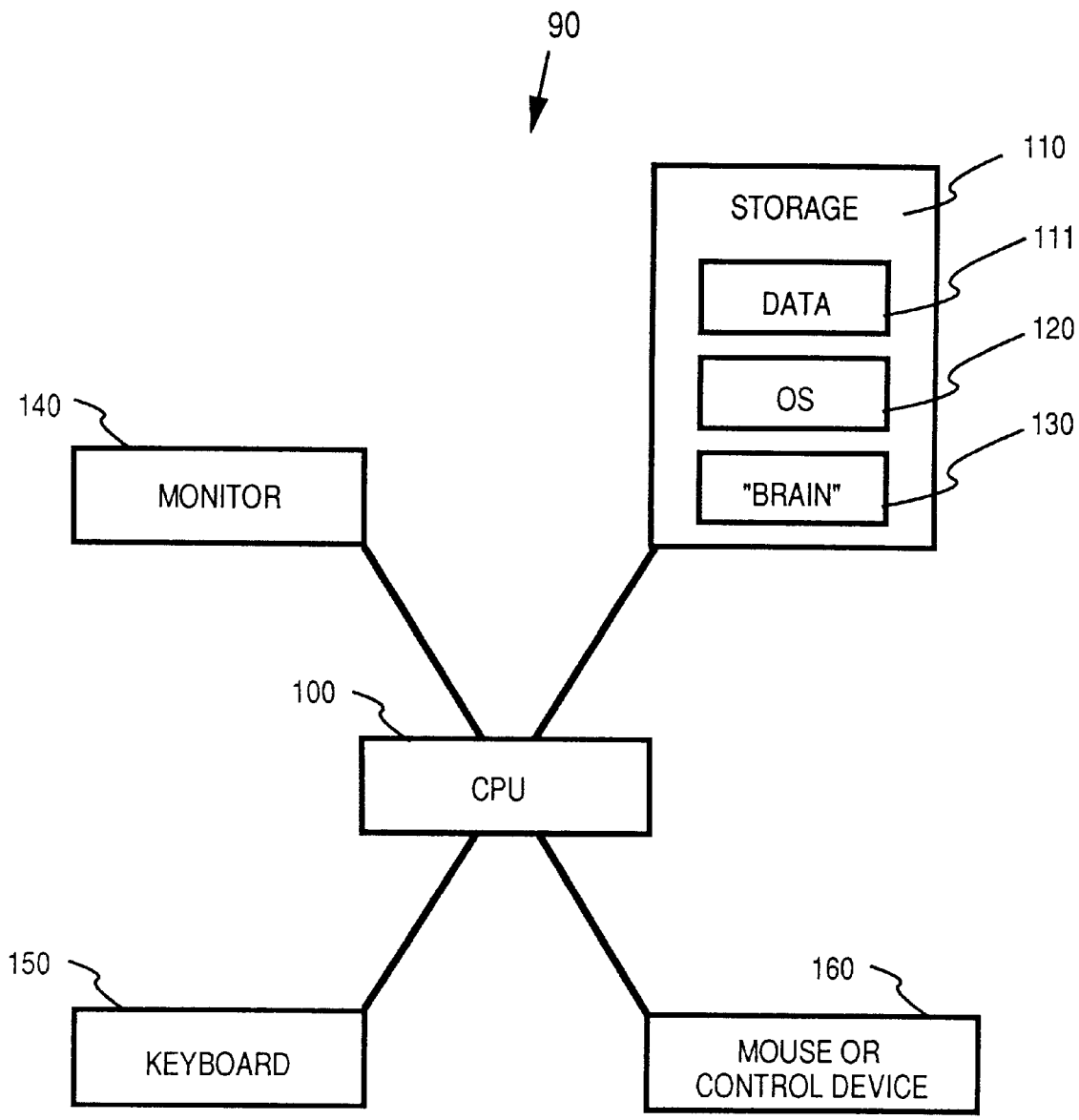
FIG. 1 illustrates the basic architecture of a computer system for use in implementing a preferred embodiment of the present invention.

FIG. 1 depicts the general architecture of a digital computer system 90 for practicing the present invention. Processor 100 is a standard digital computer microprocessor, such as a CPU of the Intel x86 series. Processor 100 runs system software 120 (such as Microsoft Windows®, Mac OS® or another graphical operating system for personal computers), which is stored on storage unit 110, e.g., a standard internal fixed disk drive. "Brain" software 130, also stored on storage unit 110, preferably includes computer program code for performing the tasks and steps described below, including the digital representation of thought networks, the display of graphical representations of such networks, and the processing of such networks in accordance with the principles of the present invention. Display output, including the visual GUI discussed below, is transmitted from processor 100 to an output device such as a video monitor 140 for display to users. Users utilize input devices such as standard personal computer keyboard 150, cursor control device 160 (e.g., a mouse or trackball), touch-screen sensors on the monitor display, or voice input to enter the GUI input commands discussed below, which are then transmitted to processor 100.

Internal Implementation of a Thought Network

Figure 2:
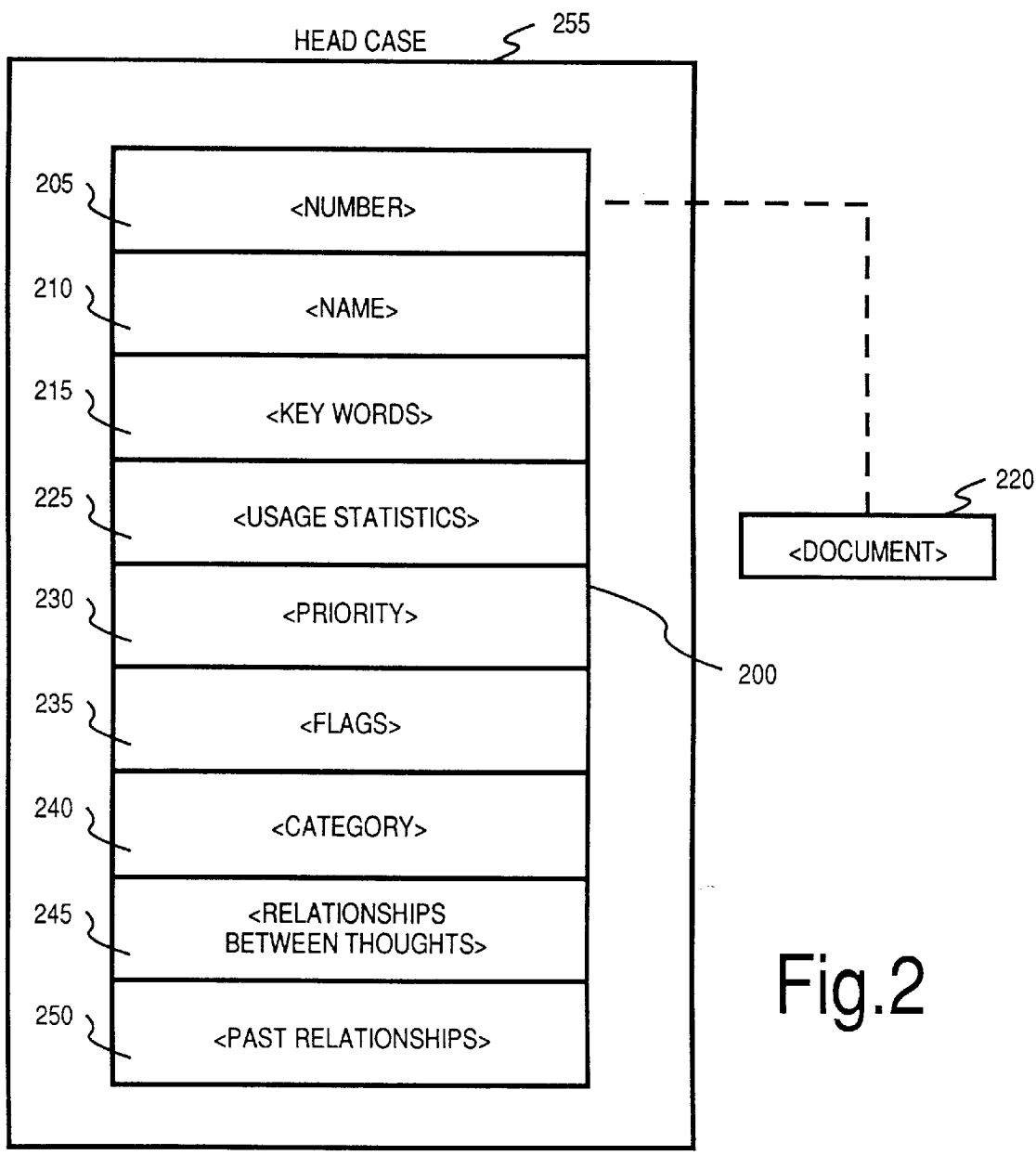
FIG. 2 illustrates a preferred data architecture for thoughts, in accordance with the present invention.

In a preferred embodiment of the present invention as illustrated in FIG. 2, a plurality of interrelated thoughts collectively make up a "Thought Network." Each such "thought" (i.e., a piece of information, such as a collection of spreadsheet data) is represented internally as comprising various elements, including properties and relationships. Properties can include, as in the example of thought 200,: number 205, name 210, key words 215, document 220, usage statistics 225, priority 230, flags 235, category 240. Relationships can include currently linked thoughts 245 and past linked thoughts 250. Except for document 220, all of the data for all thoughts is stored in a set of files 255 (which we designate "the HeadCase" in our preferred embodiment), which is invisible to the user and is transparently loaded to RAM and saved to data storage 111 as the user works.

Number 205. Each thought has a unique number which is invisible to the user but is used internally, by other thoughts or lists, to reference the thought. References to each thought thus occupy only a small amount of internal storage, and changes to a thought's user-specified name do not affect internal references.

Name 210. The "name" of a thought is intended to be a brief, textual description of that thought, written by the user. The purpose of a name is to enable users to identify the associated thought in a convenient manner.

Key Words 215. The "key words" of a thought are a list of descriptive terms inputted by the user, which list may be interactively searched using the search methods described in more detail below (see "Searching").

Document 220. Each thought includes an associated "document," which stores all of the specific content for that thought, such as word processing data or spreadsheet data. Each such document is stored internally in its own file in data storage 111 or separately stored in mass storage devices accessible by the computer system, whose name is based on the associated thought's number. As discussed further below, the user need not and does not consciously manage these files. Instead, accessing a thought automatically provides the user with a seamless, transparent way of accessing the associated document contents along with an appropriate application program or utility for processing those contents.

Usage Statistics 225. "Usage statistics" are preferably generated and stored for each thought as the user works on that thought, as discussed in greater detail below in the "Additional Features" section.

Priority 230. A priority number set by the user indicates the relative importance of a particular thought. The priority is normally manually set by the user, but can be calculated based upon the usage statistics and the relationships at the user's request. The priority can then be used to filter thoughts when searching or creating thought lists.

Flags 235. Flags provide a mechanism for designating the state of each thought. Preferably, each flag can be in one of three states: on, off, or default. When a flag is in default, the thought value is determined by the category of thought (see Category, below). Flags can be user-defined, or may be automatically provided by the system. An example of a preferred system flag is one that states whether a thought is part of long term memory.

Category 240. A thought's "category" is a number which designates a thought to be of a specific category. Thought categories are defined and named by the user. Each category specifies that thoughts of that category will have certain attributes or "fields," as well as certain default flag values (see the discussion of "flags" above). An example of a category might be "Person," in which case an example field might be "City of Residence." The use of fields to perform indexed searching is discussed in further detail below, in the "Processing Thoughts" section. Category definitions are preferably stored separately, as templates.

Relationships Between Thoughts 245. Preferably, three types of relationships are possible among thoughts: Child, Parent, and Jump. Each thought includes a separate list for each type of relationship. Each such relationship list stores a list of the other thoughts (identified by number) that are related to the instant thought by the instant type of relationship. The relationship lists are used to generate and navigate graphical representations of the thought network, as described in detail below, and are otherwise invisible to the user.

Past Relationships 250. Preferably, there is another set of three lists: for Child, Parent, and Jump relationships, respectively, which archive information about those relationships which have been severed or "forgotten" but which may be remembered upon request by the user. Essentially, this provides a long term memory facility that allows users to recall previous relationships when desired, without cluttering the current display with non-current data, as discussed below.

Graphically Representing and Navigating a Thought Network

Figure 3:
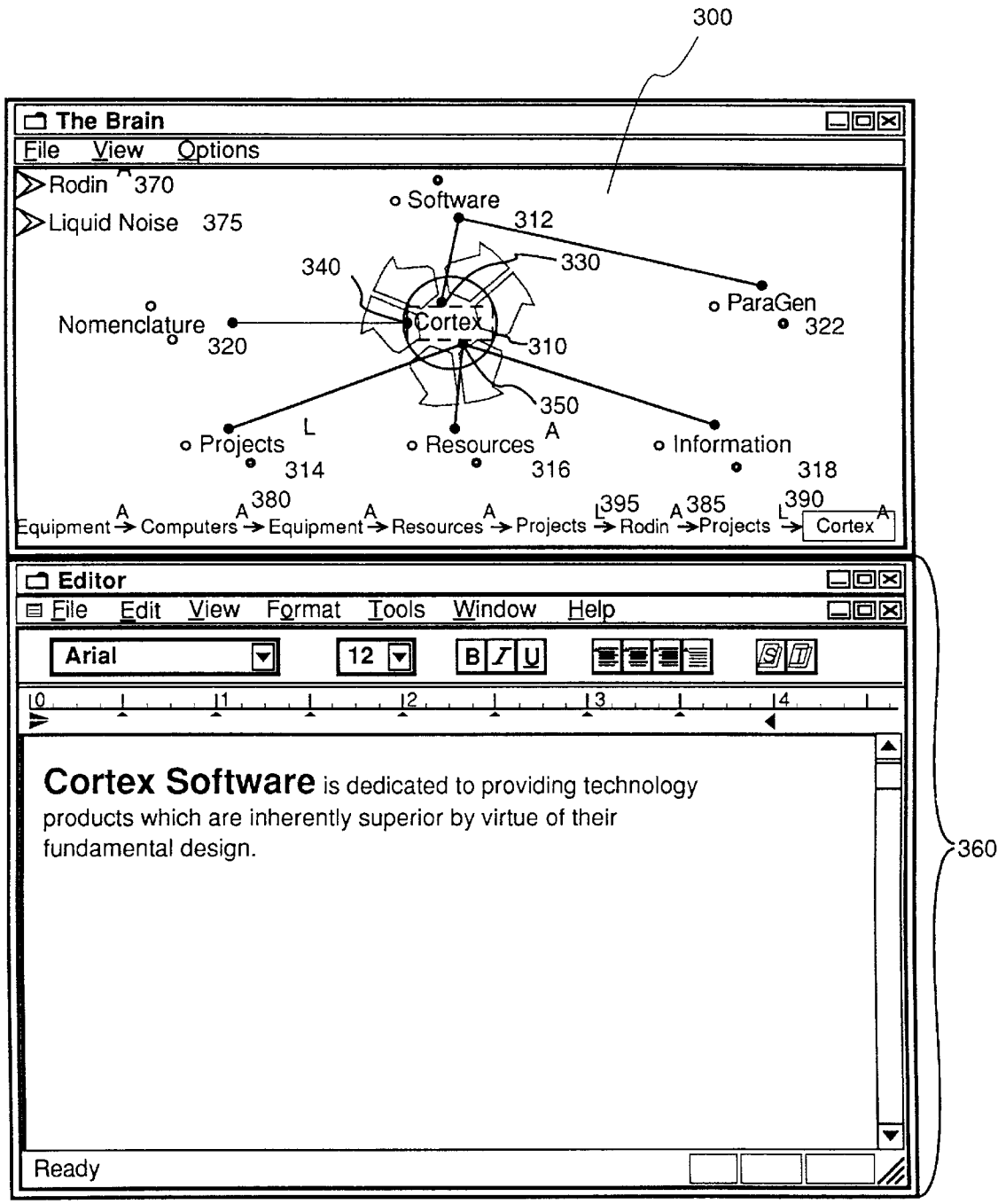
FIGS. 3, 7–9, 11–15 illustrate preferred graphical user interface screen displays, in accordance with aspects of the present invention.

FIG. 3 illustrates a typical, graphical representation ("plex 300") of a network of related thoughts which will be displayed on the monitor 140, in accordance with a preferred embodiment of the present invention. In the example of FIG. 3, central thought 310 labelled, "Cortex", is displayed in the center of the plex, preferably surrounded by a circle, a dashed rectangle, and a rotating or blinking graphic in order to call attention visually to the central thought. Thoughts that are directly related to the central thought 310 are represented in the plex 300 by display icons connected by lines to the central thought. In a preferred embodiment of the present invention, multiple categories or types of thought relationships can be specified, in the interests of providing users maximum organizational flexibility and clarity. Specifically, the present invention allows a plurality of Parent thoughts, a plurality of Child thoughts, a plurality of Jump thoughts. The present invention also provides for the display of a plurality of "Sibling" thoughts (such as the thought "ParaGen" 322), which are Child thoughts of any and all Parent thoughts (such as the thought "Software" 312) of the current Central thought ("Cortex" 330). For example, in the preferred embodiment of FIG. 3, above the central thought 310 are related Parent thoughts. In this plex there is only one, "Software" 312. Below the central thought are Child thoughts. In this plex there are three: "Projects" 314, "Resources" 316, and "Information" 318. To the left of the central thought are Jump thoughts, in this plex there is only one: "Nomenclature" 320. Finally, to the right of the central thought are Sibling thoughts which share a Parent with the central thought. In this plex there is only one—"ParaGen" 322. The underlying significance and semantics of these or other categories of thought relationships is of course entirely up to the individual practitioner and user.

Each thought in a plex preferably has three circles near it. These circles are thought "gates" (e.g. gates 330, 340, and 350 in FIG. 3), and are used to show and create the relationships between thoughts. The location of each gate tells what kind of relationship it represents. Thus, gate 330 above thought 310 is for relationships to Parent thoughts; gate 350 below thought 310 is for relationships to Child thoughts; and gate 340 on the side of thought 310 is for relationships to Jump thoughts. Note that each thought in the display of FIG. 3 is connected to central thought 310 by the appropriate gate. Preferably, each gate circle being used (i.e., a gate through which a thought is connected) is filled (e.g. gate 330); if no thought is connected through a gate, that gate's circle is empty (e.g. gate 340). In addition, gates are preferably color-coded according to the currently displayed thoughts. For example, in a preferred embodiment, if a gate is red (e.g. gate 350), this indicates that all the thoughts to which it connects are currently displayed. If a gate is green (e.g. gate 365), this indicates that there are other thoughts to which it is connected and which are not displayed on the network at this time.

Display of the network is preferably configured based upon the current thought. More specifically, the display positions of thoughts are determined by the way they are related and the number of thoughts that are related in that way. Thus, in a preferred embodiment of the invention, central thought (e.g. 310) is always drawn in the center. Above are the Parent thoughts (e.g., 312), which are drawn in up to two columns extending upward. Below are the Child thoughts (e.g., 314, 316, 318), which are drawn in up to four columns extending downward. The Jump thoughts appear to the left in a single column which extends up and down until it hits the Child thoughts, at which point it begins to extend only upward. Siblings thought appear to the right in a single column which extends up and down until it hits the Child thoughts, at which point it begins to extend only upward. In practice, the actual drawing sequence on screen preferably is performed as follows. First the background is cleared. The scaling circle and the lines that connect the thoughts are then drawn. Next, the lines are drawn between the locations of the gates representing the appropriate relationships. Finally, the actual thought names and the gates are drawn.

Figure 4:
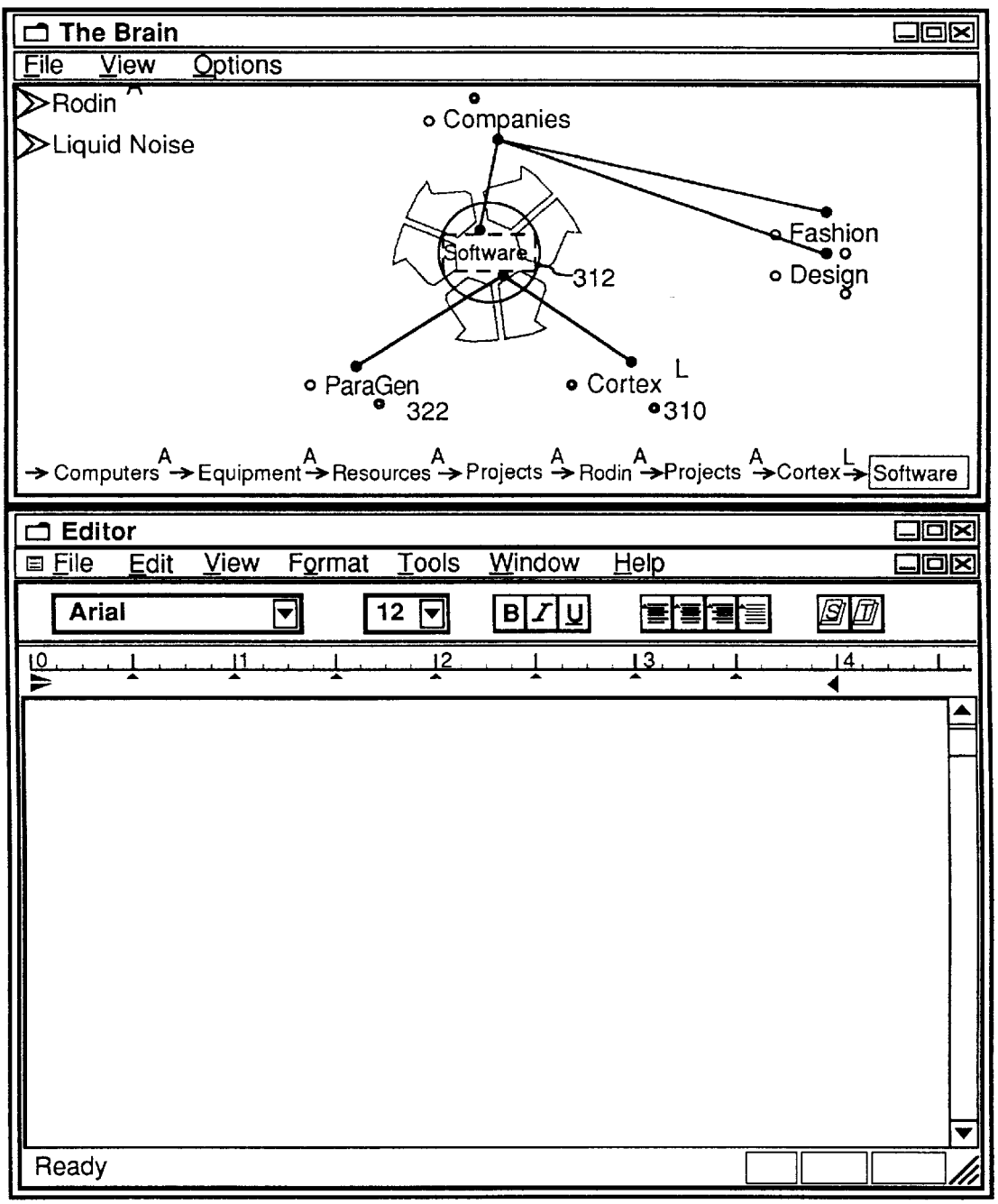
FIG. 4 illustrates the preferred graphical user interface of FIG. 3, reflecting the selection of a new current thought by a user.

Navigation and movement through the network is preferably accomplished by selecting the thought to be moved to, using control device 160 or keyboard 150 (e.g. arrows, tab, escape or space bar). The selected thought becomes the new central thought, and the network display is rearranged according to the new central thought's relationships, preferably with animation showing the movement of the thoughts. For example, FIG. 4 shows the thought network of FIG. 3, but rearranged after a user has interactively selected Software 312 as the new central thought, in place of Cortex 310. Window 360 is used to display and edit the document for the current thought, as discussed below in the section entitled "Processing Thoughts."

Defining a Thought Network

Figure 5:
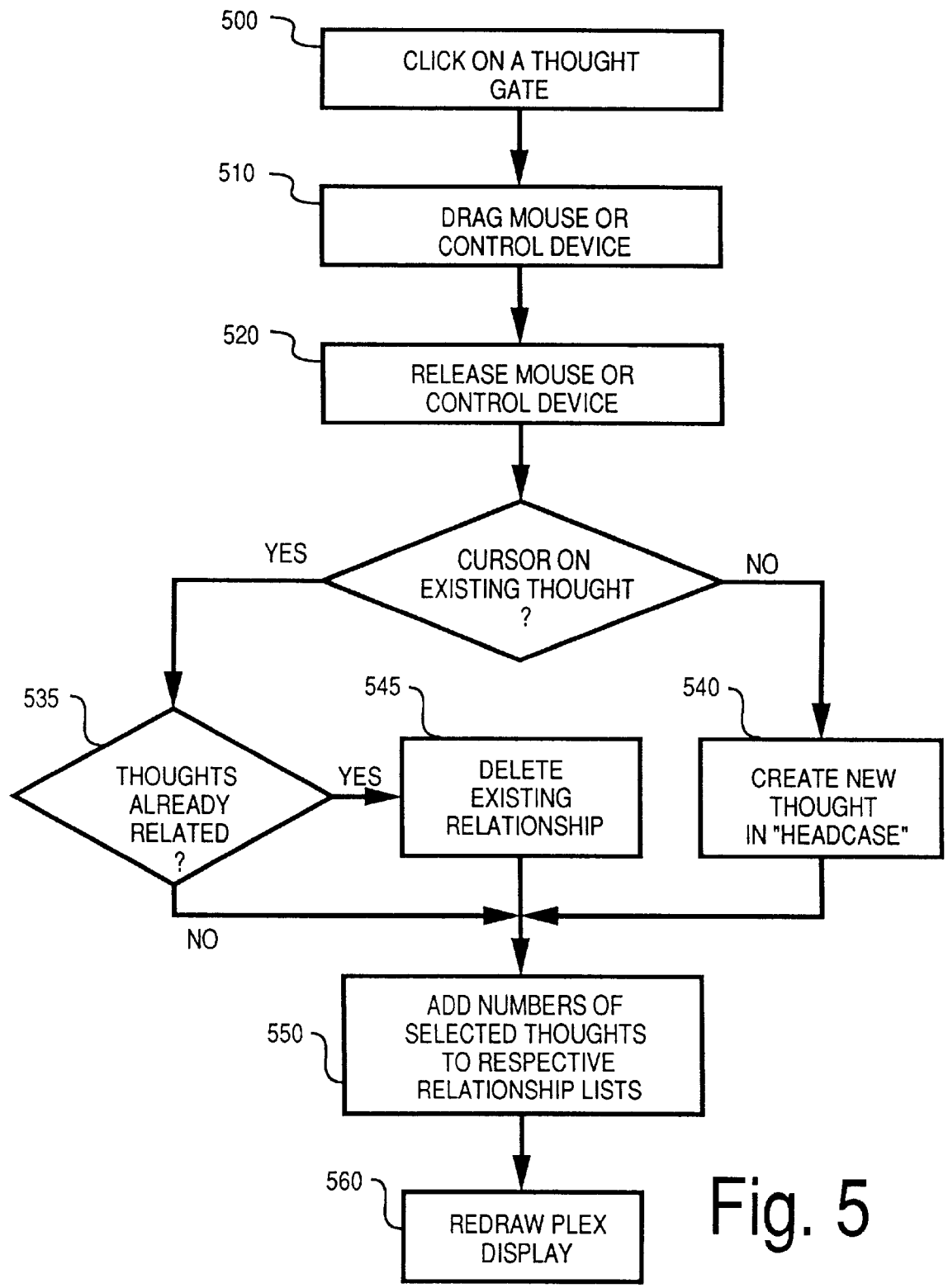
FIG. 5 is a flow diagram showing the process for creating and relating thoughts in a preferred embodiment of the present invention.
Figure 7:
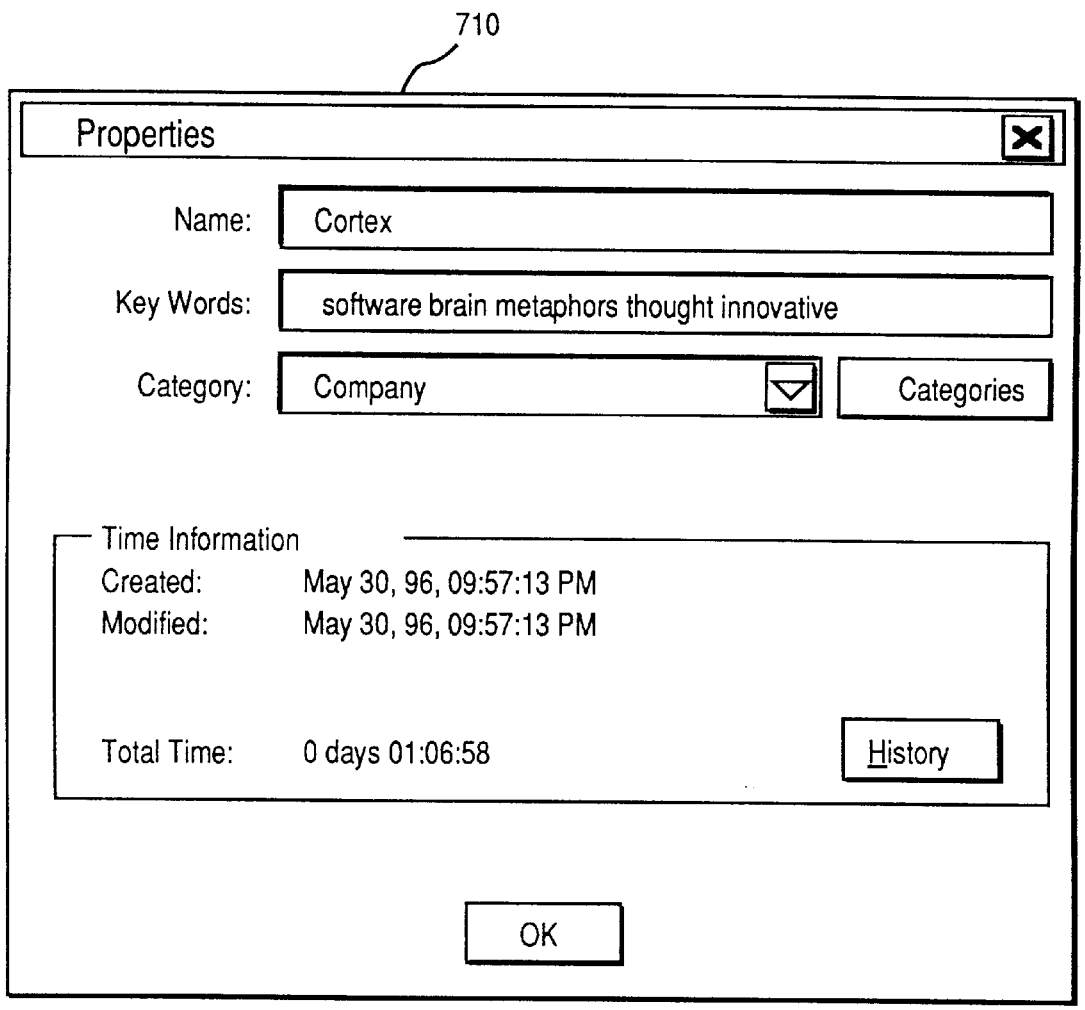

Creating New Thoughts. New thoughts are preferably created by interactively clicking and dragging, using mouse/control device 160, from any of the gates around an existing thought. FIG. 5 provides a flow diagram showing the basic steps of this process. At step 500, the user selects by clicking on a gate of an existing thought (a "source thought"), to which the new thought is to be related. At step 510, the user drags control device 160 away from the source thought; preferably, during this step, a "rubber-band" line is displayed coming out of the source thought gate and tracking the cursor controlled by mouse/control device 160. At step 520, the mouse/control device's 160 button is released. At that point, if the cursor controlled by mouse/control device 160 is located over an existing thought (a "target thought"), as indicated at decision point 530, then the system assumes the user desires to create a new relationship between the source thought and the target thought, as will be described shortly below. In order to create a new thought, the user simply releases mouse/control device 160 with the cursor at an unoccupied location on the screen. In that case, as shown at step 540, a new thought is created and added to Headcase 290. Preferably, a dialog box 710 (see FIG. 7) appears and asks for the new thought's name and/or other properties; a unique new thought number is created to refer to this thought; all of the new thought's data fields are initialized to default values; and the thought's number is added to a global list of all thoughts.

Next, at step 550, a relationship is created between the source thought and the new thought, preferably based upon the type of gate of the source thought that was selected at step 500. In particular, the new thought's number is added to the appropriate relationship list (245) of the source thought, and the source thought's number is added to the appropriate relationship list (245) of the new thought. Finally, at step 560, the updated plex is redrawn, reflecting the newly created thought and its relationship to the source thought.

Relating Existing Thoughts. Existing thoughts may be related using the same method as is used to create new thoughts. Referring again to FIG. 5, steps 500 through 520 are the same. However, at decision point 530, control device 160 is determined to have been released with the cursor located over an existing thought (the "target thought"). In that case, at step 535, the relationship list 245 (FIG. 2) of the source thought and target thought are checked to ensure that the thoughts are not already directly related. If such a relationship does exist, it is preferably deleted at step 545 by removing the source and target thoughts' numbers from each other's current relationship lists, to avoid any ambiguities. Next, at step 550, the source and target thoughts' numbers are added to each other's appropriate relationship list (245), as determined by the source thought's gate type originally selected at step 500. The redefined network is redrawn at step 560. If such a relationship does not exist, then step 545 is inapplicable and step 550 is processed immediately after step 535 is executed.

Figure 8:
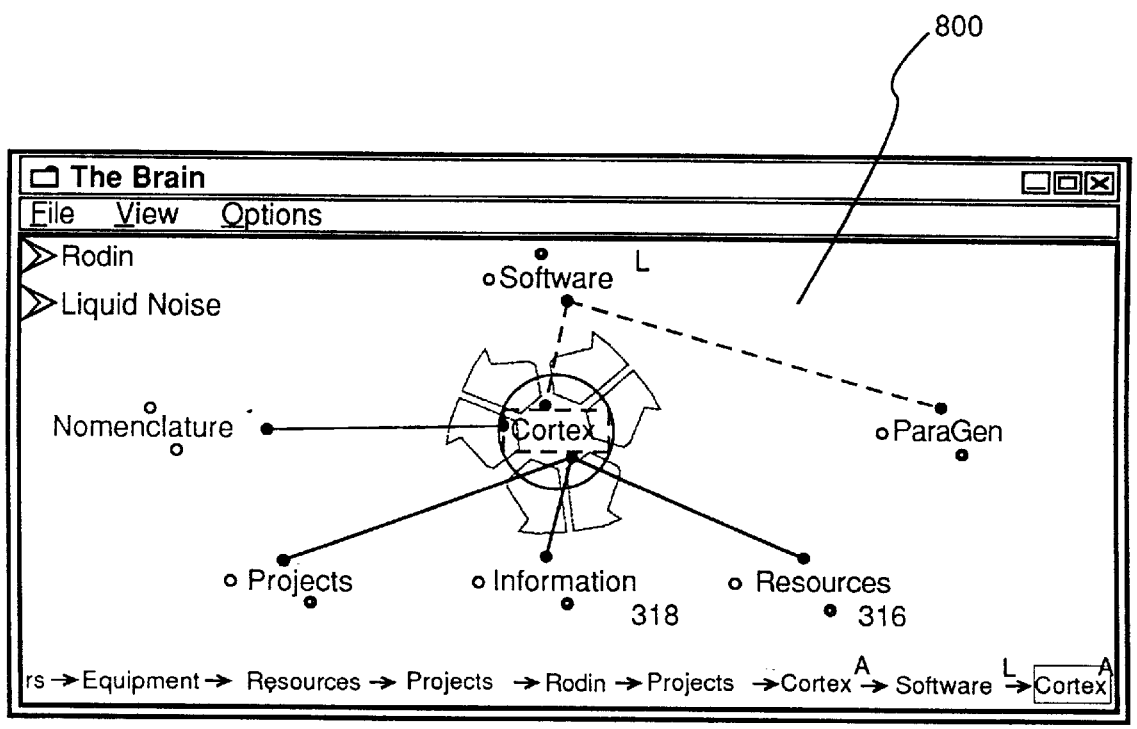

Reordering Relations. Related thoughts are drawn in the plex according to the order they are listed in the relationships list of the central thought. By dragging the thoughts in the display, the user can specify in what order they should be listed and as a result, where they will appear. In reference to FIG. 3, FIG. 8 provides an example of the display 800, in the preferred embodiment, which would result if a user were to interactively reverse the order of thoughts 316 and 318, causing the icons representing those thoughts 316 and 318 to switch horizontal positions as demonstrated by the positions of those thoughts 316 and 318 in FIG. 8.

Figure 6:
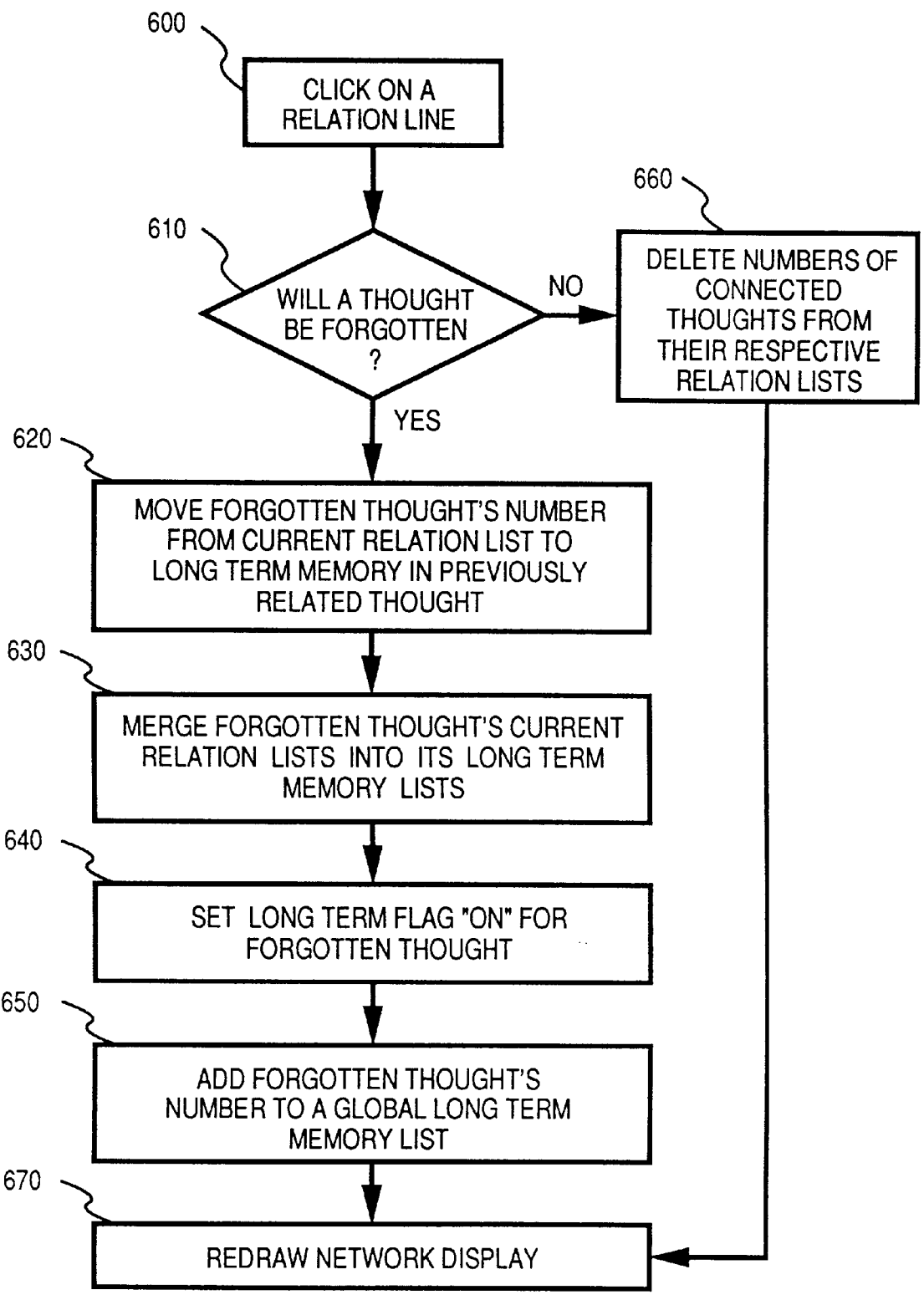
FIG. 6 is a flow diagram showing the process for severing relationships between thoughts in a preferred embodiment of the present invention.

Severing Relations Between Existing Thoughts. It is possible to sever the relationship between two existing thoughts, such as central thought 310 ("Cortex") and Child thought 314 ("Projects"), using a process similar to the process used to define a new relationship between existing thoughts. As the flow diagram in FIG. 6 outlines, at step 600, the user requests that a particular relationship be severed, by clicking on the relationship lines which connect two thoughts such as the line connecting thoughts 310 and 314 in FIG. 3. Next, at decision point 610, a check is made to see if the requested severing would involve the special case of "forgetting," as will be explained shortly. If no "forgetting" will occur, then at step 660 the numbers of the two thoughts are removed from each other's relationship lists and the line between thoughts 310 and 314 in the graphical display shown in FIG. 3 may be removed.

The special case of "forgetting" an existing relationship will now be explained. Consider the example network shown in FIG. 3. If the relation between thought 314 ("Projects") and central thought 310 ("Cortex") is severed, then there will be no path at all connecting thought 314 with central thought 310, and thus no way to access thought 314 from the current thought. Thought 314 will be isolated. In that sense, thought 314 will be "forgotten" if the severing is performed. Therefore, in the process depicted by FIG. 6, decision point 610 detects such cases (see below, "Determining if thoughts will be isolated"). In such cases, the number of the "forgotten" thought (i.e., thought 314) is deleted from the current relation list 245 (FIG. 2) of central thought 310 at step 620, and is added to the corresponding past relationship list 250 of central thought 310. Recall that the past relation lists 250 are included as part of each thought's data structure, as illustrated in FIG. 2. Next, the forgotten thought's own fields are revised to reflect its status as a "forgotten" thought: namely, at step 630, thought 314's current relationship lists 245 are merged into its past relations lists 250 (i.e., copied from 245 to 250 and then erased from 245), and at step 640 its "long term memory" flag is set to "on." At step 650, forgotten thought 314 is preferably added to a global long term memory thought list. At step 670, the plex is redrawn, reflecting the absence of forgotten thought 314. It is possible to forget more than one thought at once, in which case all of the forgotten thoughts will be modified as described for thought 314.

Determining If Thoughts Will Be Isolated. A thought will be isolated when it is not possible to return to the central thought via any link other than that link which is being severed. Similarly, any thoughts ("Rodin" 950 and "Liquid Noise" 960 in FIG. 9) related to the severed thought ("Projects" 314) will be forgotten so long as their only link to the central thought existed via the severed thought ("Projects" 314). One method of determining whether it is possible to return to the central thought from a thought whose link has been severed is illustrated by the recursive algorithm disclosed in FIG. 10.

Figure 11:
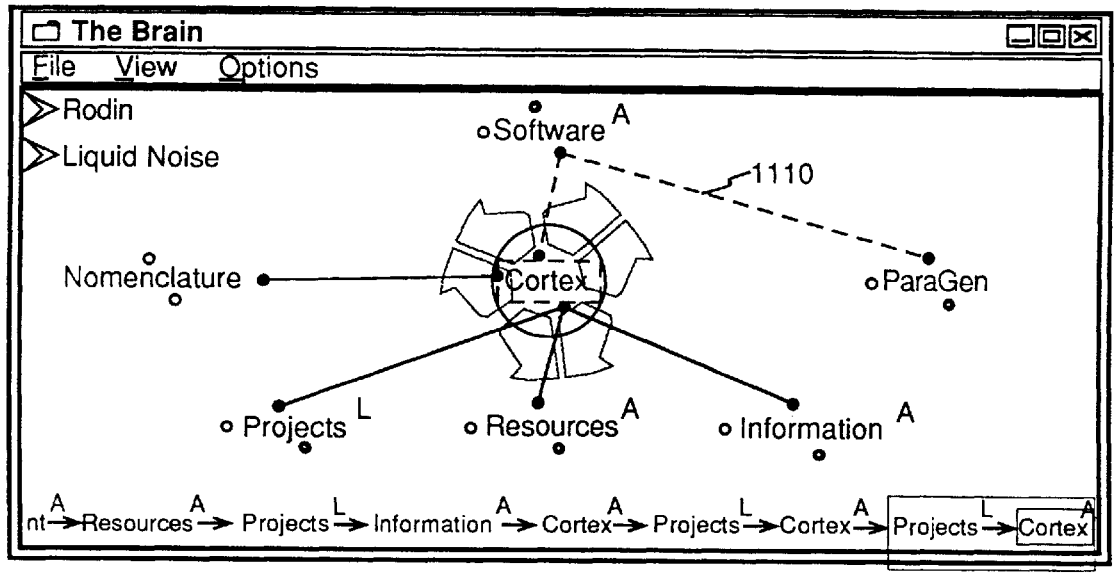
Figure 12:
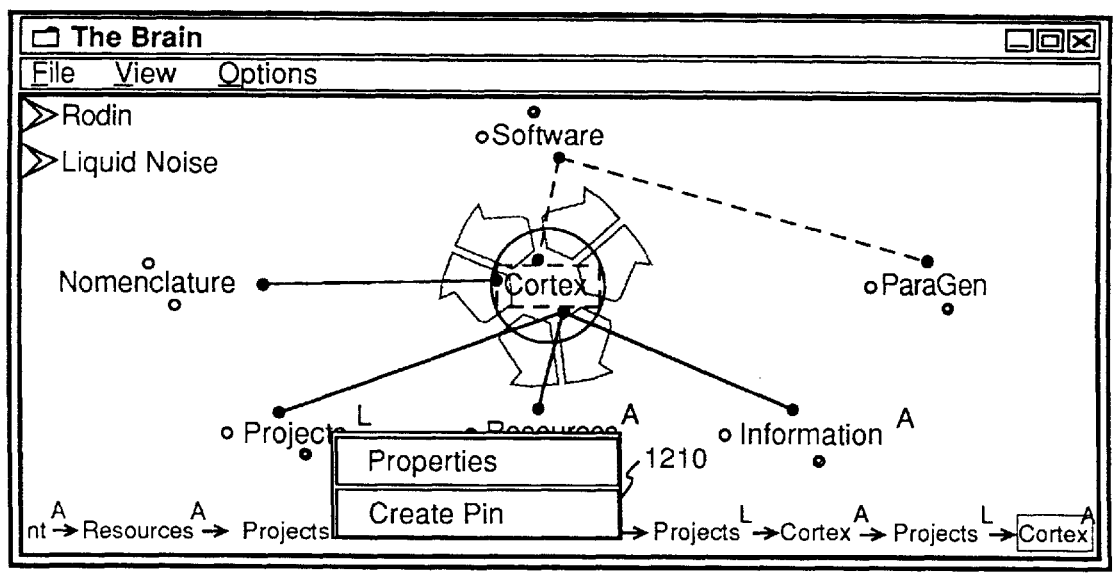

Accessing Long Term Memory. To access thoughts that are stored in long term memory, preferably the user can interactively turn on the display of long term memory relationships (for example, by means of a menu selection or function key). The display will then be refreshed, and thoughts related by long term memory relationships will become visible and are connected (as shown in FIG. 11) to the central thought with a line, such as line 1110, of different sort than that used for normal relationships. A long term relationship can then be recreated as a current relationship by using the "Relating Existing Thoughts" technique described above. In that case, the appropriate thought numbers (See FIG. 2) are copied from past relationship lists 250 to the appropriate, current relationship lists 245. The appropriate thought numbers are then moved in the global long term and short term memory lists, and the display is once again redrawn.

In an alternative embodiment of the present invention, each thought's Head Case does not include a list of past relationships. Rather, each thought's Head Case merely contains a flag identifying it as a forgotten thought or a present thought. When a user interactively turns on a display of long term memory within this alternative embodiment, forgotten thoughts and their relationships to present thoughts are are added to the display, and severed relationships between present thoughts will not reappear. This alternative embodiment may offer certain advantages, including without limitation (i) presenting the user with a simpler, more readily comprehensible set of information regarding past relationships within the thought network; and (ii) reducing the complexity of the thought network's data structure and hence the computing resources used to operate the thought network.

Permanently Deleting a Thought. It is also possible to permanently remove a thought from the thought network. This is accomplished by clicking on a line (such as line 1110) which connects a thought which is already in long term memory. When severing a relationship in this manner results in a thought or thoughts becoming isolated, this thought or thoughts are removed from the global thought list and from the past relationships list 250 of the central thought.

Creating New Thought Flags and Types. To define a new thought flag, the user interactively selects a thought and then enters a flag name and its default state. To define a new thought type, the user enters the name of the new type, its default flag states, and any fields that the type has. The new types and flags can thereafter be referenced by the user when creating new thoughts or changing thought properties.

Figure 13:
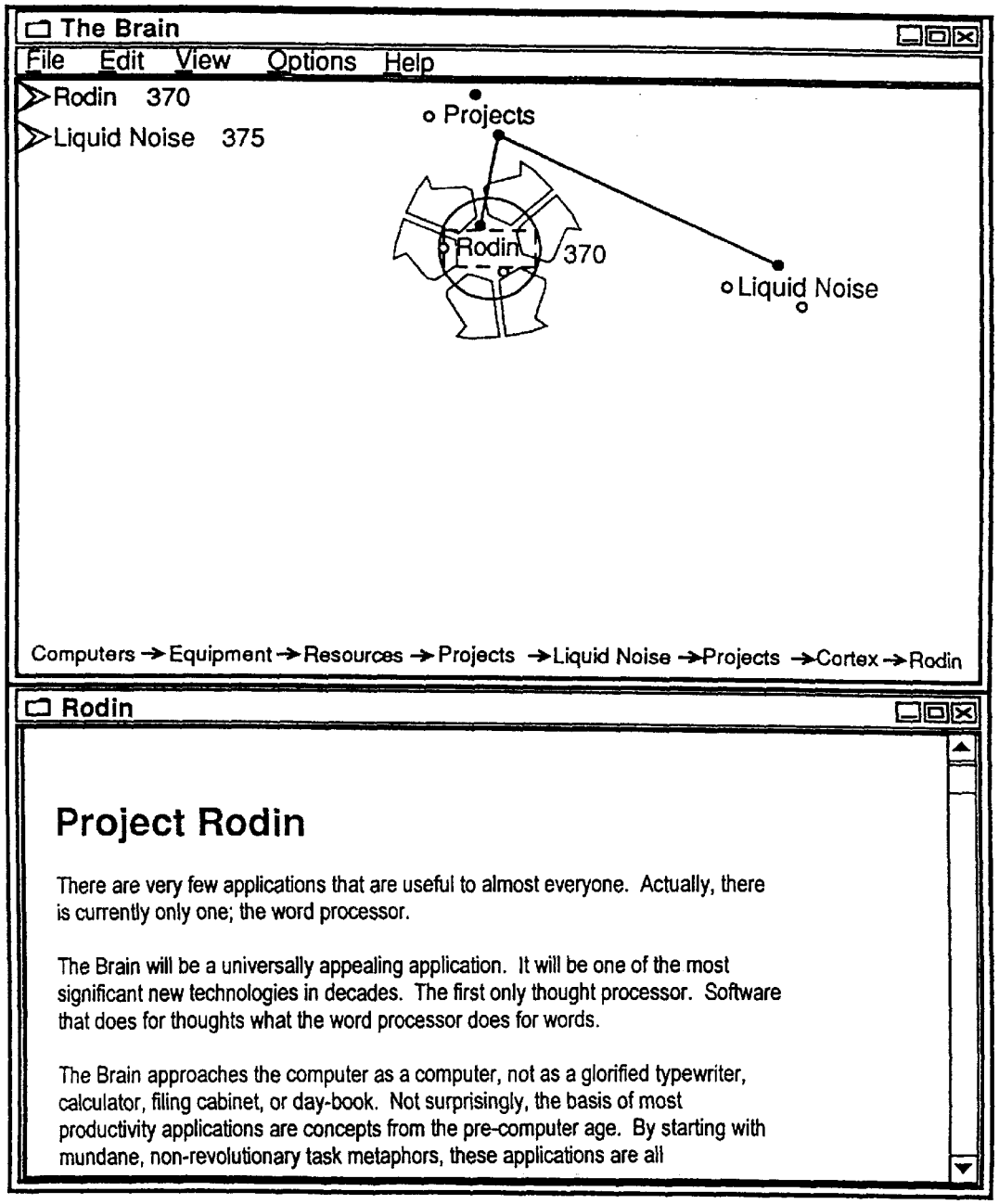

Thought Pins. Thought pins are used to get instant access to commonly used thoughts. In the upper left corner of FIG. 3 are two thought pins 370 and 375, labelled "Rodin" and "Liquid Noise." Thought pins can be moved by the user to any location or deleted. To create a new thought pin, the user simply moves the cursor (using mouse/control device 160), and clicks on or otherwise highlights the existing thought for which a thought pin is to be created, and then selects a "Create Pin" command or the like from an ensuing pop-up command menu (such as menu 1210). Selecting an existing thought pin (e.g., using mouse/control device 160 to position the cursor over the pin, then clicking the control devices's button) makes the pin-represented thought into the new central thought of the current plex. For example, selecting thought pin 370 ("Rodin") in FIG. 3 would result in the plex transforming into the plex displayed in FIG. 13, with thought 370 ("Rodin") as the central thought. Note that thought pins are preferably represented internally by the number(s) of the thought(s) they reference and an explicit, user-specified display location.

Creating Thought Plexes. As described earlier, thought plexes are the graphical displays of a group of related thoughts, consisting of Central thought and any Parent, Child, Jump, and Sibling thoughts. There is always at least one thought plex. Additional thought plexes can be created by using the control device 160 to position the cursor over any thought other than the central thought, and dragging the selected thought to the desired location of the new plex. Each time a user creates a plex, that plex is added to the screen display along with the other plexes previously presented on the screen display (See FIG. 9).

Figure 9:
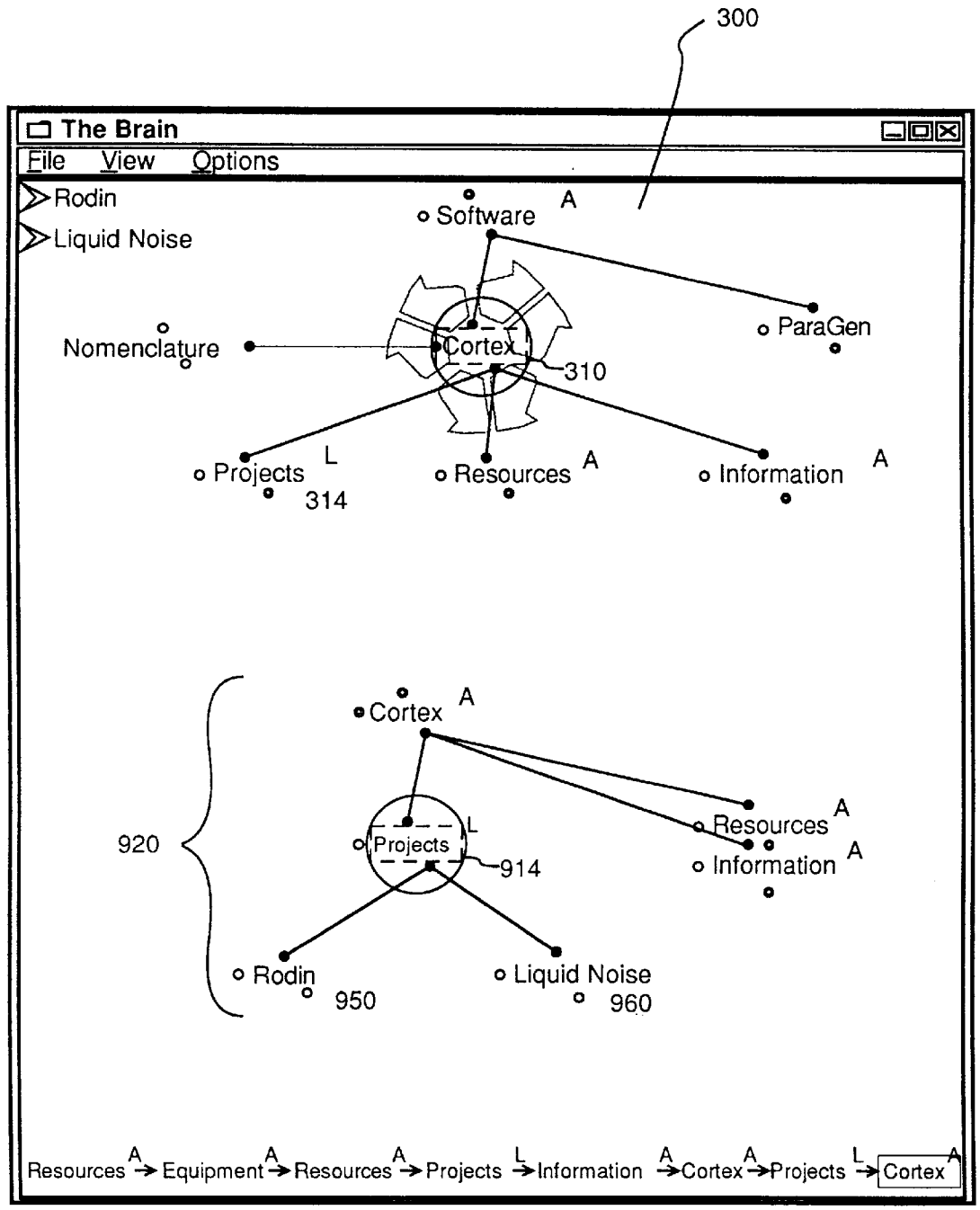

The figures demonstrate an example of the manner in which a new plex may be created. First, in FIG. 3, a user interactively selects the thought 314 ("Projects") to be a new central thought by using control device 160 to position the cursor over that thought, then selects the thought by clicking and holding a button on the cursor control device. The user then employs control device 160 to move the cursor to the desired location of the new plex and releases the button. FIG. 9 demonstrates the screen display which results. Plex 920 has been added to the screen display, with the thought 914 ("Projects") as the central thought of new plex 920.

Moving Thought Pins and Plexes. In the preferred embodiment, thought pins can be repositioned by dragging them with the mouse or other control device. Thought plexes can be reposited be dragging their central thought with the mouse or other control device. Thought pins and plexes can be deleted by dragging them off of the display. Eliminating a plex from the display does not result in any thoughts being forgotten. Forgetting involves a different user-interactive process discussed above (see "Severing Relations Between Existing Thoughts"). The separate process of forgetting is discussed above.

Resizing a Thought Plex. In the preferred embodiment, a thought plex can be seized by dragging the circle which surrounds the central thought. Making the circle bigger makes the entire plex bigger and vice-versa.

Changing a Thought Pin. A thought pin can be made to reference a different thought simply by dragging the desired thought onto the pin.

Doing a Brain Freeze. In response to a user's request or in response to a regularly scheduled system request for backup, a "Brain Freeze" saves the state of all parts of a thought network at a given point in time, copying all the information to a read-only format for later use.

Processing Thoughts

Editing Thought Documents. Each thought's document contents are displayed in document window 360, as illustrated in FIG. 3. When the current thought is changed, the last thought's document is saved (unless otherwise directed by the user) if necessary and then the new current thought's document is loaded automatically. The user never has to issue "save" or "open" commands to access thought documents, nor does the user need to explicitly identify or invoke an editor or other application program to process the thoughts. These operations are performed automatically by the system, seamlessly and transparently. When a thought is activated by the user, the system saves the previously active thought, if it has changed, then loads the newly active thought. Well-known computer programming object technologies including without limitation Microsofts' Object Linking and Embedding ("OLE") allow the document to make references to data which is created and edited by other programs. Using standard operating systems calls, the present invention can display and allow the user to edit these objects with the appropriate computer programs. In addition, the document may also store references to the location of other documents on the storage systems available to the computer, allowing the user to open them with the appropriate computer programs using a more traditional operating system method.

Changing Thought Properties. Thought properties such as name, flags, priority, and category can be changed using a thought properties dialog box, such as dialog box 710, which is accessed by the user employing mouse/control device 160 and/or keyboard 150 to select a particular thought and then the thought properties dialog box.

Figure 14:
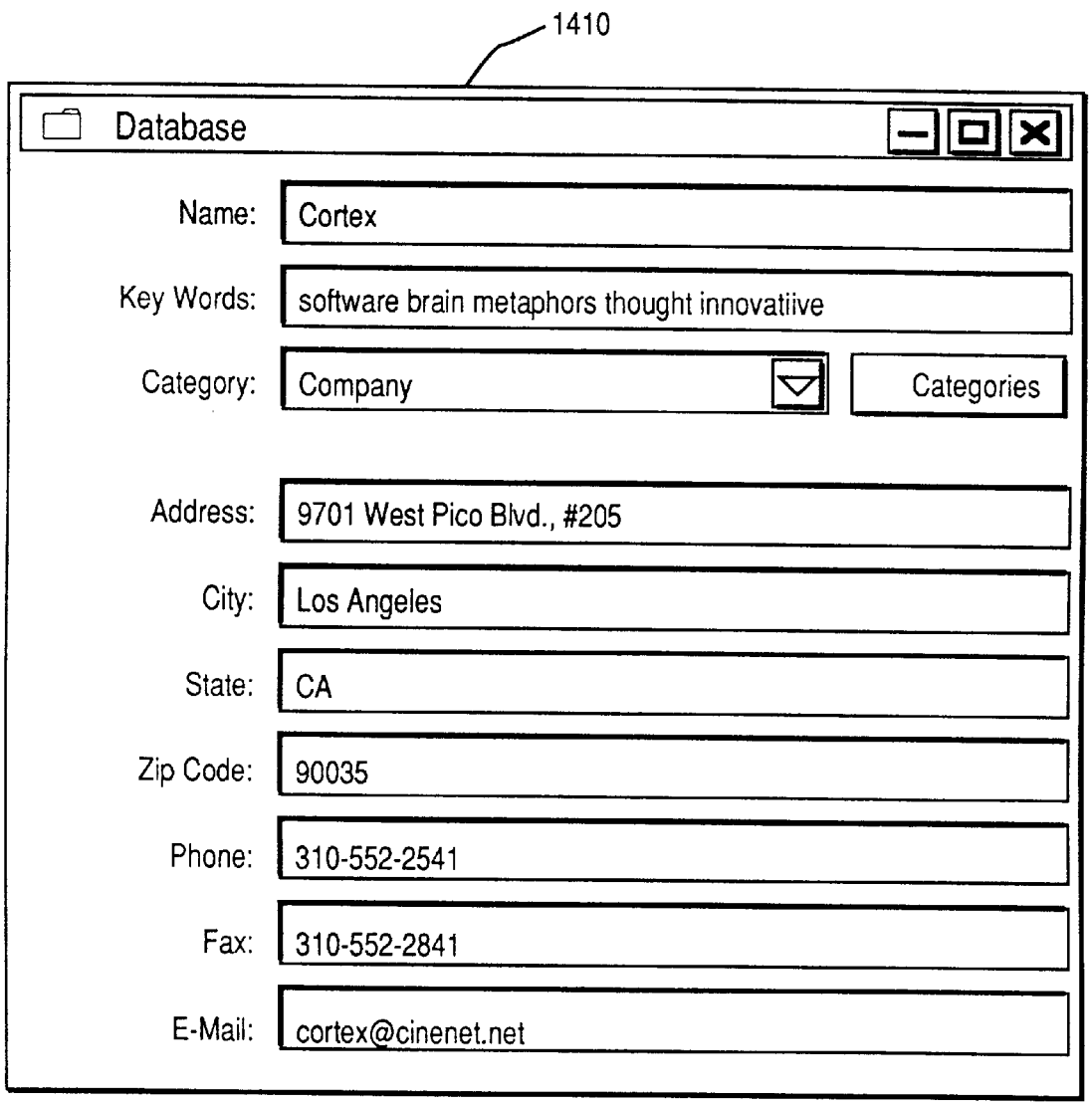

Editing Thought Fields. Thought fields can be edited in a dialog box or window such as 1410 in FIG. 14. In the preferred embodiment, the field names are displayed to the left and their contents to the right. Thought fields are automatically loaded and saved, in the same fashion as are the contents of thought documents, invisibly to the user every time a thought field is modified. All thoughts of a certain category possess the same available thought fields, which fields are defined by the user in establishing and modifying thought categories (see above, "Category").

In a preferred embodiment, every thought category 240 possesses at least two fields. Those default fields are the "Name" field and the "Key Words" field. The contents of these default fields are identical to the contents of the properties called "Name" and "Key Words" respectively.

Rewinding and Replaying Previous Operations. An event list is created automatically by the system, as the user works. The event list is a recording of each action the user takes. It stores how to undo each action and how to repeat each action. This information is then used to "rewind" and "replay" the actions of the user, upon the user's request.

Thought Lists. Internally, thought lists are simply a list of numbers. To the user, they are displayed as a list of thought names. A preferred embodiment of the present invention keeps a list of all short term memory thoughts and long term memory thoughts. In addition, a list of thoughts is created for each defined thought type. Lists of thoughts can also be manually created (see below, "Trains of Thought" and "Searching"). The user can activate a thought in a list (make it central in the current plex) by clicking on it. Thought lists can also be used to perform group operations on thoughts such as printing, changing properties, or even saving (to save only a selected portion of the thought network).

The Past Thought List. One special example of a preferred thought list is the past thought list. FIG. 3 illustrates how a past thought list 380 can be created automatically as the user works. Each time the user changes the current thought, the number of the last thought is added to the Past Thought List. In the preferred embodiment, it is possible to display the past thought list as a list (such as past thought list 380) of thoughts which scrolls along the bottom of the display as the user activates thoughts. For example, each time a user activates a separate thought, the previously activated thought is placed at the right-hand end of past thought list 380 pushing the older thoughts to the left of the screen. The oldest thought that cannot fit on screen is eliminated from view from the left-hand end of past thought list 380.

Trains of Thought. Another special example of a preferred thought list is the "train of thought," which lists a series of thoughts in a particular sequence as desired by the user. A train of thought can be created by simply navigating through the desired thoughts in the same order as the users wants them to appear in the train of thought. This will automatically cause the desired sequence of thoughts to become part of the past thought list, as noted above. As shown in FIG. 11, the user then interactively selects the desired section of the past thought list using mouse/control device 160. In the case of FIG. 11, the user has selected "Projects" and "Cortex"—the two most recent thoughts—for inclusion in a train of thought. The user then interactively selects the Create Train command 1120 by using a pull down menu, function key or similar means. In response, the selected sequence of thoughts is copied to a new thought list and the user is asked to name it, thus creating a new "train of thought" thought list.

Trains of thought can be used for accomplishing tasks that involve a number of pre-existing parts. For example, an attorney might use a train of thought to assemble a number of pre-existing sections of text (stored in separate thought documents) into a new contract, or an engineer or computer programmer can use trains of thought to assemble a new computer program out of a pre-existing library of subroutines.

Searching. Thought lists can preferably be filtered or "searched" according to thought category, priority, name, flags, fields, etc. This allows the thought network to be used as a searchable database. For example, one thought type might be the type "Person," which might include the attribute "City". Each thought of the Person type would then be assigned a specific "City" value by the user. Users could then request a search of the network for all thoughts involving persons they know who live in a certain city, by requesting a display of all thoughts on the "Person" type list, filtered as to those whose "City" attribute equals the desired value.

Similarly, enables users to create project plans, daily agendas, or to-do lists or other task-oriented thought lists and create relevant thought lists. First, the user assigns priority levels (e.g. "urgent," "important," "unimportant") or flags (e.g. "completed" or "incomplete") to thoughts as they work (See "Changing Thought Properties" above). The present invention enables users later to create a to-do list, for example, by searching for thoughts associated with a flag set in the "incomplete" position and a priority level of "urgent." The search engine operates in a method similar to those widely used in commercially available database programs.

Usage statistics. Usage statistics suitable for keeping track of billable time, productivity, work habits or efficiency are preferably generated and stored for each thought as the user works on that thought, according to the system clock. These statistics include time of creation, time of last modification, time of last access by user and the time (if applicable) at which the thought was "forgotten." Each thought also stores the total number of seconds the user has so far spent processing it, the number of "events" (keyboard and mouse clicks) that occurred, and the thought's modification history (., a list of all dates when that thought was modified and how long each such modification took).

Preferably, the system supports interactive commands for requesting the display of these usage statistics. For example, in the preferred embodiment, a user can request to view usage statistics falling within a given time period. FIG. 3 demonstrates how the preferred embodiment of the present invention can display usage information automatically. By default, the preferred embodiment shows a "C" next to each thought which was recently created (380); an "A" next to each thought which was recently accessed (380, 385); an "L" next to the last active thought (390, 395); and an "M" next to each thought which was recently modified (not illustrated).

Undoing and Redoing. Undoing and redoing of operations is preferably supported by an internally stored event list which keeps track of how data is affected and what is necessary to undo the effects of each event. When something is undone the undo event is recorded to the redo list to enable redoing.

Figure 15:
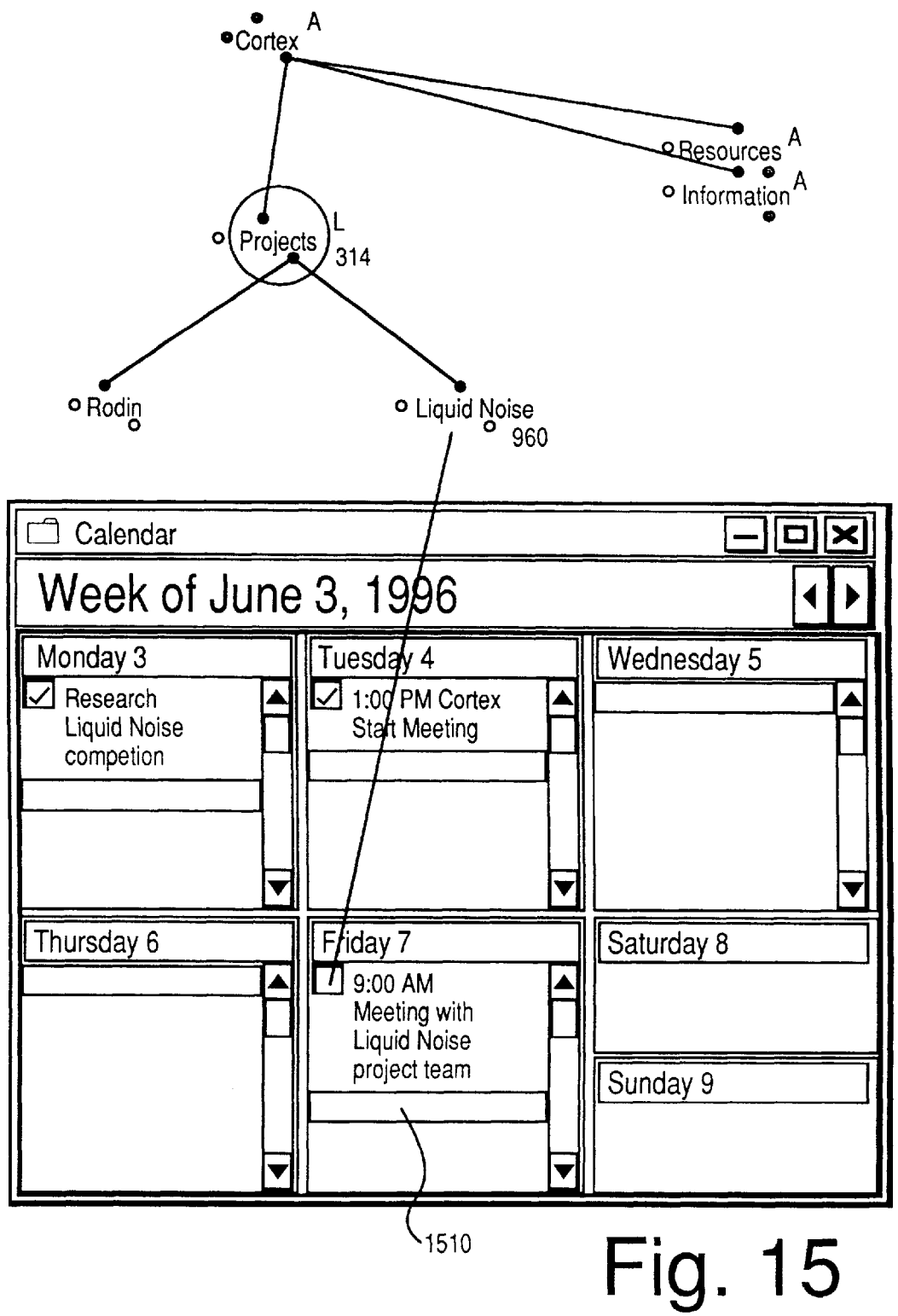

Calendar Scheduling. By storing thought numbers in events, appointments, schedule data, or other time-based items, it is possible to associate time based events with thoughts. A calendar can then be used by the user to keep track of events and link related thoughts to the events. For example, in the preferred embodiment, rather than displaying thoughts graphically in plexes, thoughts can be displayed on a calendar as demonstrated in FIG. 15. For example, the calendar event 1510 ("9:00 am meeting with Liquid Noise project team") may be associated with "Liquid Noise" thought 960. The preferred embodiment of the present invention permits a user to create that association by using the mouse/control device 160 to draw a line connecting the calendar event 1510 and the desired thought 960. When a user interactively selects calendar event 1510, thought 960 becomes the new central thought (as illustrated).

In addition, thoughts may be associated through calendar events with computer program operations. For example, if calendar event 1510 were associated with an alarm program, then at 9:00 am, the alarm would sound, and the present invention could also be configured to display a reminder message, or activate "Liquid Noise" thought 960 as the new central thought.

Other Variations

Detailed illustrations of an improved scheme of ongoing information by an associative thought process in accordance with the present invention have been provided above for the edification of those of ordinary skill in the art, and not as a limitation on the scope of the invention. Numerous variations and modifications within the spirit of the present invention will of course occur to those of ordinary skill in the art in view of the preferred embodiments that have now been disclosed. For example, while in the described embodiment, the present invention is implemented for a GUI for desktop computers or local area or wide area computer networks (e.g. the Internet), the present invention may also be effectively implemented for any information appliance which can take advantage of the novel associative thought scheme of the present invention. Such variations, as well as any other systems embodying any of the following claims, all remain within the scope of the present invention.

I claim:

1. A method for organizing and processing a plurality of thoughts using a digital computer, the method comprising the following steps:

defining a thought network that includes the plurality of thoughts, among which is an initial current thought, and at least one network relationship between the initial current thought and one or more of the other thoughts;

displaying a first graphical representation of the thought network from the perspective of the initial current thought;

selecting a new current thought from the first graphical representation; and in response to the selection of the new current thought determining which of the plurality of thoughts, if any, are related to the new current thought, and displaying a second graphical representation of the thought network from the perspective of the new current thought.

2. The method of claim 1 further including the step of associating each of the thoughts with one or more software application programs;

and processing the current thought by automatically invoking the application program associated with the current thought in a transparent manner.

3. The method of claim 1 further comprising the following steps:

creating a new network relationship among two or more of the thoughts; and displaying a third graphical representation of the thought network including the new network relationship.

4. The method of claim 1 further comprising the following steps:

deleting an existing network relationship among two or more of the thoughts; and displaying a third graphical representation of the thought network including at least one of the previously related thoughts and excluding the deleted network relationship.

5. The method of claim 1, further including the following steps:

associating each of the thoughts with one or more attribute values;

specifying a desired set of one or more attribute values; and searching for a subset of the thoughts having attribute values equal to the desired set of attribute values.

6. The method of claim 1, further including the steps of associating one or more usage statistics with one or more of the thoughts, said usage statistics describing one or more processing tasks performed by a user in connection with the one or more thoughts.

7. The method of claim 6, further including the step of displaying a history of said one or more processing tasks, based upon the usage statistics.

8. The method of claim 6, further including the step of undoing said one or more processing tasks, based upon the usage statistics.

9. The method of claim 1, further including the following steps:

associating one or more of the thoughts with one or more scheduled times and desired operations;

and automatically executing the desired operation on each of the one or more thoughts at the scheduled time.

10. The method of claim 1, wherein the second graphical representation of the network is displayed in a first window and data associated with the new current thought are simultaneously displayed in a second window.

11. The method of claim 1, wherein at least one of the thoughts in the thought network is associated with data stored remotely on digital computer or storage devices.

12. A system for organizing and processing a plurality of thoughts using a digital computer, the system comprising:

a definition of a digital computer data structure that can represent a thought network including the plurality of thoughts, among which is an initial current thought, and at least one network relationship between the initial current thought and one or more of the other thoughts; and a current thought network display mechanism that, in response to the selection of a current thought, can determine which of the plurality of thoughts, if any, are related to the current thought, and can display a graphical representation of the thought network from the perspective of the current thought, whereby the display mechanism can display a first graphical representation of the thought network from the perspective of the initial current thought and, in response to the selection of a new current thought from the first graphical representation, can determine which of the plurality of thoughts, if any, are related to the new current thought, and can display a second graphical representation of the thought network from the perspective of the new current thought.

13. The system of claim 12 wherein each of the thoughts can be associated with one or more software application programs, and the system can invoke automatically the application program associated with the new current thought.

14. The system of claim 12, wherein the thought network represented by the data structure can be modified to include a new network relationship among two or more of the thoughts; and the current thought network display mechanism can display the modified thought network, including the new network relationship.

15. The system of claim 12, wherein the thought network represented by the data structure can be modified to delete an existing network relationship among two or more of the thoughts; and the current thought network display mechanism can display the modified thought network, including at least one of the previously related thoughts, and excluding the deleted network relationship.

16. The system of claim 12, wherein each of the thoughts can be associated with one or more attribute values, and a desired combination of attribute values can be specified as criteria for a search that yields a subset of the thoughts having attribute values meeting such criteria.

17. The system of claim 12, wherein one or more of the thoughts can be associated with one or more usage statistics, said usage statistics describing one or more processing tasks performed by a user in connection with the one or more thoughts.

18. The system of claim 17, wherein the system can display a history of said one or more processing tasks, based upon the usage statistics.

19. The system of claim 17, wherein the system can undo said one or more processing tasks, based upon the usage statistics.

20. The system of claim 17, wherein one or more of the thoughts can be associated with one or more scheduled times and desired operations such that the system automatically executes the desired operation on each of the one or more thoughts at the scheduled time.

* * * * *